US012585528B2

(12) United States Patent
Philip et al.

(10) Patent No.:  US 12,585,528 B2
(45) Date of Patent:  Mar. 24, 2026

(54) MACHINE LEARNING TECHNIQUE TO DIAGNOSE SOFTWARE CRASHES

(71) Applicant: Synopsys, Inc., Sunnyvale, CA (US)

(72) Inventors: Mathew Vetticalayil Philip, Palo Alto, CA (US); Joseph Robb Walston, Durham, NC (US); Stylianos Diamantidis, Sunnyvale, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 150 days.

(21) Appl. No.: 18/748,043

(22) Filed: Jun. 19, 2024

(65) Prior Publication Data

US 2024/0338273 A1      Oct. 10, 2024

Related U.S. Application Data

(63) Continuation of application No. 17/184,839, filed on Feb. 25, 2021, now Pat. No. 12,045,124.

(60) Provisional application No. 63/150,544, filed on Feb. 17, 2021.

(51) Int. Cl.
| | |
|---|---|
| *G06F 11/00* | (2006.01) |
| *G06F 11/07* | (2006.01) |
| *G06F 11/3668* | (2025.01) |
| *G06N 20/20* | (2019.01) |

(52) U.S. Cl.
CPC ........ *G06F 11/079* (2013.01); *G06F 11/0751* (2013.01); *G06F 11/3688* (2013.01); *G06F 11/3692* (2013.01); *G06N 20/20* (2019.01)

(58) Field of Classification Search
CPC .............. G06F 11/079; G06F 11/0751; G06F 11/3688; G06F 11/3692; G06F 11/36; G06F 11/3684; G06F 11/368; G06F 11/3668; G06N 20/20
See application file for complete search history.

(56) References Cited

U.S. PATENT DOCUMENTS

2017/0161182 A1*   6/2017   Yoshida ................. G06N 20/10

* cited by examiner

*Primary Examiner* — Katherine Lin
(74) *Attorney, Agent, or Firm* — Patterson + Sheridan, LLP

(57) ABSTRACT

The present disclosure describes a system and method for generating references for software crashes. The method includes applying a first machine learning model to a test case for a software application to adjust the test case to produce an adjusted test case and executing the adjusted test case on the software application to produce a software crash. The method also includes applying a second machine learning model to the software crash to generate a reference crash signature for the software crash and logging, using the second machine learning model, a reference crash configuration for the software crash.

20 Claims, 5 Drawing Sheets

MACHINE LEARNING TECHNIQUE TO DIAGNOSE SOFTWARE CRASHES

CROSS-REFERENCE TO RELATED APPLICATIONS

This application claims priority U.S. Non-Provisional patent application Ser. No. 17/184,839 filed Feb. 25, 2021 which claims the benefit of U.S. provisional patent application Ser. No. 63/150,544, filed Feb. 17, 2021. The aforementioned related patent application is herein incorporated by reference in their entirety.

TECHNICAL FIELD

The present disclosure generally relates to a software analysis system. In particular, the present disclosure relates to a system and method for providing machine learning to diagnose and treat software application crashes.

BACKGROUND

When errors occur during execution of a software application, the application may crash, often resulting in the application reaching an unrecoverable state. The application may need to be restarted for the application to function again. The application, however, may crash again if the conditions that led to the crash are satisfied.

SUMMARY

According to an embodiment, a method includes receiving a crash signature and a crash configuration. The crash signature is generated in response to a software crash in a software application caused by the crash configuration. The method also includes applying a first machine learning model to determine a reference of a plurality of references that is closest to the crash signature and the crash configuration. The reference includes a reference crash signature and a reference configuration. The reference crash signature and the reference configuration are generated by a proxy crash to the software crash. The proxy crash was generated prior to the software crash by executing a modified test case against the software application.

In certain embodiments, the method also includes ranking the plurality of references based on their distances to the crash signature and the crash configuration after applying the first machine learning model.

In some embodiments, the method further includes applying a second machine learning model to the crash configuration to determine a workaround for the software crash. The second machine learning model may use a reward function to determine the workaround.

In an embodiment, the method also includes adjusting, by a second machine learning model, a configuration of a test case to produce the modified test case. The method may further include executing, by the second machine learning model, the modified test case against the software application to generate the proxy crash. The method may include generating, by a third machine learning model, the reference crash signature and the reference configuration based on the proxy crash.

The crash signature may include a crash stack or a memory dump of the software crash.

According to another embodiment, an apparatus includes a memory and a hardware processor communicatively coupled to the memory. The hardware processor receives a crash signature and a crash configuration. The crash signature is generated in response to a software crash in a software application caused by the crash configuration. The hardware processor also applies a first machine learning model to determine a reference of a plurality of references that is closest to the crash signature and the crash configuration. The reference includes a reference crash signature and a reference configuration. The reference crash signature and the reference configuration are generated by a proxy crash to the software crash. The proxy crash was generated prior to the software crash by executing a modified test case against the software application.

In certain embodiments, the hardware processor also ranks the plurality of references based on their distances to the crash signature and the crash configuration after applying the first machine learning model.

In some embodiments, the hardware processor applies a second machine learning model to the crash configuration to determine a workaround for the software crash. The second machine learning model may use a reward function to determine the workaround.

In an embodiment, the hardware processor adjusts, by a second machine learning model, a configuration of a test case to produce the modified test case. The hardware processor may further execute, by the second machine learning model, the modified test case against the software application to generate the proxy crash. The hardware processor may generate, by a third machine learning model, the reference crash signature and the reference configuration based on the proxy crash.

The crash signature may include a crash stack or a memory dump of the software crash.

According to another embodiment, a system includes a database and a proxy crash device. The database stores a plurality of references. Each reference of the plurality of references includes a reference crash signature and a reference configuration. The proxy crash device receives a crash signature and a crash configuration. The crash signature is generated in response to a software crash caused by the crash configuration. The proxy crash device also applies a first machine learning model to determine a reference of the plurality of references that is closest to the crash signature and the crash configuration and generates a proxy crash to the software crash using the reference crash signature and the reference configuration of the reference. The proxy crash approximates the software crash.

In certain embodiments, the proxy crash device also ranks the plurality of references based on their distances to the crash signature and the crash configuration after applying the first machine learning model.

In some embodiments, the proxy crash device further applies a second machine learning model to the crash configuration to determine a workaround for the software crash. The second machine learning model may use a reward function to determine the workaround.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a machine learning technique to diagnose software crashes. When a software application crashes, a user may request assistance from the application's developer. The developer may find it difficult to diagnose and fix the crash primarily because the developer typically needs to first reproduce the crash on the developer's machine. The developer, however, may not have access to the user's data or to the user's environment, both of which may be needed to reproduce the crash. As a result, the developer is unable to diagnose and fix the crash.

This disclosure describes a system that uses machine learning to diagnose software application crashes. The system receives a crash signature (e.g., a call stack, software variables, software settings, etc.) and a crash configuration (e.g., device settings, global variables, device model, etc.) from a user when the user experiences a software application crash. Generally, the crash signature represents or captures information about the crash at the application level (e.g., the function calls, variables, and settings in the application that resulted in the crash), and the crash configuration represents or captures information about the crash at the device level (e.g., the configuration and settings of the device that resulted in the crash). The system then applies a machine learning model on the crash signature and the crash configuration to predict a proxy crash for the software application crash. For example, the machine learning model may compare the crash signature and the crash configuration to reference crash examples in a database. The system may then determine the reference crash examples that are closest to the crash signature and the crash configuration. These reference crash examples may serve as proxy crashes for the software application crash. A developer may then review these reference crash examples to diagnose the crash without necessarily reproducing the crash in the developer's environment, in particular embodiments. The system will be described in more detail using FIGS. 1 through 5.

Figure 1:
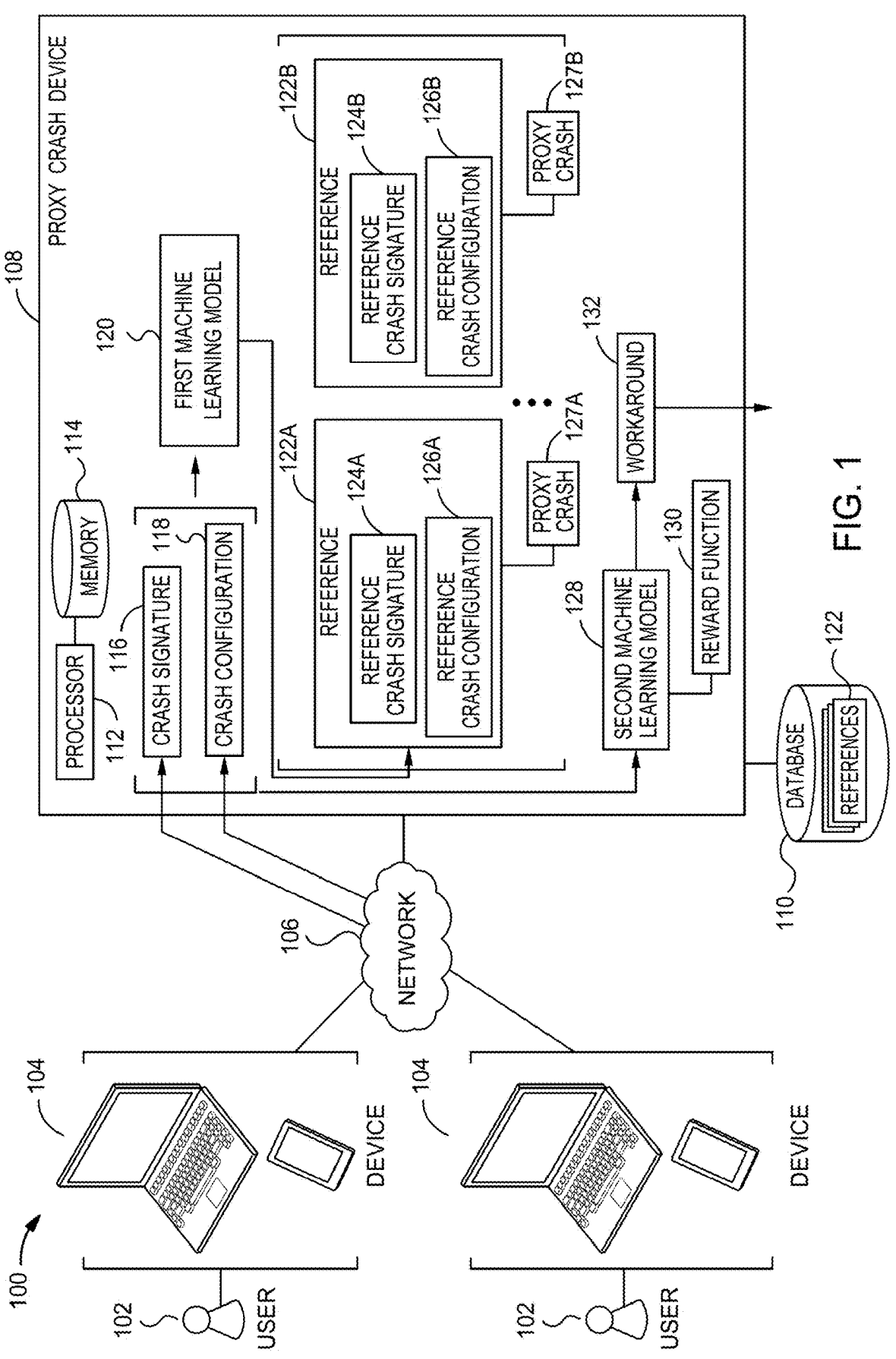
FIG. 1 illustrates an example system.

FIG. 1 illustrates an example system 100. As seen in FIG. 1, the system 100 includes one or more devices 104, a network 106, a proxy crash device 108, and a database 110. Generally, when software application crashes occur on the device 104, the device 104 may communicate a crash signature and a crash configuration to the proxy crash device 108. The proxy crash device 108 may then apply a first machine learning model 120 to the crash signature and the crash configuration to identify one or more references from the database 110 that approximate the software application crash on the device 104. In this manner, the software application crash may be diagnosed or resolved without recreating the software application crash in certain embodiments.

A user 102 may use the device 104 to execute software applications and to interact with other components of the system 100. When the device 104 executes a software application, the software application may crash causing the software application to reach an unrecoverable state. The user 102 may desire that the crash be diagnosed and fixed so that the application operates correctly in the future. The device 104 may log certain information related to the crash. For example, the device 104 may log a configuration of the device 104 (e.g., device settings, global variables, device model, etc.) when the crash occurred. Additionally, the device 104 may log software information (e.g., a call stack, internal variables, software settings, etc.) that resulted in the crash. The device 104 may then communicate this information to the proxy crash device 108 so that the crash can be diagnosed and resolved.

The device 104 includes any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The information about the device 104 and the information about the software application that are communicated by the device 104 to the proxy crash device 108 may be insufficient to reproduce the software application crash. Importantly, because access to the user data used by the software application is typically restricted for confidentiality or privacy reasons, a developer may be unable to reproduce the software application crash. For example, the developer may not be able to perform the exact steps that a user 102 performed to produce the crash because the developer cannot access the same data that the user 102 uses.

The proxy crash device 108 analyzes information about software application crashes to determine proxy crashes 127 that approximate the software application crashes. In this manner, the proxy crash device 108 may analyze the proxy crash 127 to diagnose and resolve software application crashes without reproducing the software application crashes in particular embodiments. As seen in FIG. 1, the proxy crash device 108 includes a processor 112 and a memory 114, which are configured to perform the functions and actions of the proxy crash device 108 described herein.

The processor 112 is any electronic circuitry, including, but not limited to microprocessors, application specific integrated circuits (ASIC), application specific instruction set processor (ASIP), and/or state machines, that communicatively couples to memory 114 and controls the operation of the proxy crash device 108. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on memory to perform any of the functions described herein. The processor 112 controls the operation and administration of the proxy crash device 108 by processing information (e.g., information received from the devices 104, network 106, and memory 114). The processor 112 may be a programmable logic device, a microcontroller, a microprocessor, any suitable processing device, or any suitable combination of the preceding. The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The proxy crash device 108 receives a crash signature 116 from a device 104. The crash signature 116 may include information about the software application (e.g., a call stack, software variables, software settings, etc.). The device 104 may generate the crash signature 116 automatically when a software application crash occurs. The proxy crash device 108 may use the information in the crash signature 116 to determine a proxy crash 127 that approximates the software application crash.

The proxy crash device 108 receives a crash configuration 118 from a device 104 when a software application crash occurs. The crash configuration 118 may include information about the configuration of the device 104 (e.g., global variables, device settings, device settings, operating system information, device model, etc.). The device 104 may generate the crash configuration 118 automatically when the software application crash occurs.

The crash signature 116 and the crash configuration 118 may not provide sufficient information to reproduce the software application crash in the device 104. For example, the proxy crash device 108 may not receive user data that was used by the software application when the software application crashed. Without that information, the proxy crash device 108 may not be able to reproduce the software application crash. User data may generally not be provided due to confidentiality or privacy concerns. As a result, a system may not be able to diagnose or resolve the software application crashes.

The proxy crash device 108 may analyze the crash signature 116 and the crash configuration 118 to determine a proxy crash that approximates the software application crash on the device 104. Generally, the proxy crash device 108 applies a first machine learning model 120 to the crash signature 116 and the crash configuration 118 to determine a reference 122 stored in the database 110 that approximates the software application crash. The database 110 may store one or more references 122 that represent various proxy crashes 127. The database 110 may be internal to the proxy crash device 108 or coupled directly to the proxy crash device 108. Alternatively, the database 110 may be part of the network 106, and the proxy crash device 108 may communicate with the database 110 over the network 106. The proxy crash device 108 may determine or retrieve any number of references 122 from the database 110 based on the analysis of the crash signature 116 and the crash configuration 118.

Each of the references 122 include a reference crash signature 124 and a reference crash configuration 126 that represent a proxy crash 127. Generally, the reference crash signature 124 represents or captures information about the proxy crash 127 at the application level (e.g., the function calls, variables, and settings in the application that resulted in the proxy crash 127), and the reference crash configuration 126 represents or captures information about the proxy crash 127 at the device level (e.g., the configuration and settings of the device that resulted in the proxy crash 127). The first machine learning model 120 may compare the crash signature 116 and the crash configuration 118 with the reference crash signatures 124 and the reference crash configurations 126 of the references 122 in the database 110 to determine the reference 122 that most closely approximate the software application crash in the device 104. In some embodiments, the first machine learning model 120 may determine multiple references 122 and rank the references 122 based on how closely those references 122 approximate the software application crash in the device 104.

In the example of FIG. 1, the first machine learning model 120 determines a reference 122A and a reference 112B based on the crash signature 116 and the crash configuration 118. The reference 122A may represent a proxy crash 127A and the reference 122B may represent a proxy crash 127B. The first machine learning model 120 may have determined the references 122A and 122B by calculating a distance between the references 122A and 122B and the crash signature 116 and the crash configuration 118. For example, the first machine learning model 120 may determine a distance between the crash signature 116 and the reference crash signatures 124 and a distance between the crash configuration 118 and the reference crash configurations 126. The machine learning model may determine these distances, for example, by (1) vectorising the crash signature 116, the reference crash signatures 124, the crash configuration 118 and the reference crash configurations 126 and then (2) calculating the dot products between the vector for the crash signature 116 and the vectors for the reference crash signatures 124 and between the vector for the crash configuration 118 and the reference crash configurations 126. As another example, the machine learning model may determine these distances by determining differences between the crash signature 116 and the reference crash signatures 124 and between the crash configuration 118 and the reference crash configurations 126. The more differences there are between the crash signature 116 and a reference crash signature 124 or between the crash configuration 118 and a reference crash configuration 126, the greater the distance between them. After determining the distances, the first machine learning model 120 may then combine these distances (e.g., determining an average or sum of the distances) to determine the distances between the references 122 and the crash signature 116 and the crash configuration 118. The first machine learning model 120 may then rank the references 122A and 122B based on these determined distances. For example, the reference 122 with the shortest distance to the crash signature 116 and the crash configuration 118 (e.g., the reference 122 that is closest to the crash signature 116 and the crash configuration 118) may be given the highest rank by the first machine learning model 120.

The reference 122A includes a reference crash signature 124A and a reference crash configuration 126A. The reference 122B includes a reference crash signature 124B and a reference crash configuration 126B. Each of the references 122A and 122B may represent a proxy crash 127 that generated the corresponding reference crash signature 124 and the corresponding reference crash configuration 126. For example, a reference crash signature 124 may include a call stack, software variables, or software settings of the proxy crash 127, and a reference crash configuration 126 may include environment variables, global settings, or a device model of the proxy crash 127.

The proxy crash device 108 may approximate the software application crash in the device 104 based on the determined references 122. For example, a developer may select any one of the determined references 122 as a proxy crash 127 that approximates the software application crash in the device 104. The proxy crash device 108 may then generate the proxy crash 127 based on the selected reference 122, the selected reference crash signature 124, or the selected reference crash configuration 126. The developer may then analyze the proxy crash 127 to diagnose and potentially fix the software application crash in the device 104 without reproducing the software application crash in the device 104.

The first machine learning model 120 may implement any machine learning model or technique to determine the references 122. For example, the first machine learning model 120 may implement a Bayesian model, natural language processing, image processing, convolutional networks, or supervised learning.

In particular embodiments, the proxy crash device 108 applies a second machine learning model 128 to the crash signature 116 or the crash configuration 118 to determine a workaround 132 to the software application crash. The workaround 132 may allow the user 102 to use the application without encountering the software application crash. The second machine learning model 128 may use a reward function 130 to determine the workaround 132. For example, the second machine learning model 128 may adjust the crash configuration 118 while using the software application to determine if the software application crashes. If a certain adjusted configuration does not result in a software application crash, the reward function 130 may reward the machine learning model 128 for finding a workaround 132. If the software application crashes when using the adjusted configuration, the machine learning model 128 may not be rewarded, thus indicating that the second machine learning model 128 has not found a desired workaround 132. Based on the reward, the second machine learning model 128 may learn the adjustments to make to discover workarounds to subsequent or future crashes. In embodiments where the second machine learning model 128 does not use a reward function, the second machine learning model 128 may try a series of predefined or preprogrammed adjustments to see if any of these adjustments result in a crash. Adjustments that do not result in a crash may be returned as workarounds. The proxy crash device 108 may communicate one or more workarounds 132 to the device 104, so that the user 102 may apply the workaround 132 and avoid the software application crash.

For example, crash signature parameters may be automatically evaluated for potential workarounds that do not produce the observed field crash. This is accomplished by using second machine learning model 128 that uses the inputs used in the observed crash and along with the reward function 130. The numerical inputs observed in the crash in the field are used as soft bounds to the machine learning model 128 while any categorical or Boolean inputs are least perturbed. The reward function 130 rewards successful runs that also have inputs as close as possible to the observed crash inputs. For example, if the observed crash used a tool setting ALPHA with numerical value x, the machine learning model 128 may be trained to prefer a new numerical tool setting y such that |x-y| is the smallest among all the available choices while also changing the least number of categorical or Boolean inputs and ensuring that the software under test does not experience a crash or instability. The goal is to provide a workaround that has the least disturbance to an existing workflow as possible by changing its inputs as little as possible. Several workarounds can be generated and these workarounds can be automatically shared with end-users and field support staff.

The second machine learning model 128 may implement any machine learning model or technique to determine the workarounds 132. For example, the second machine learning model 128 may implement a Bayesian model, natural language processing, image processing, convolutional networks, or supervised learning.

Figure 2:
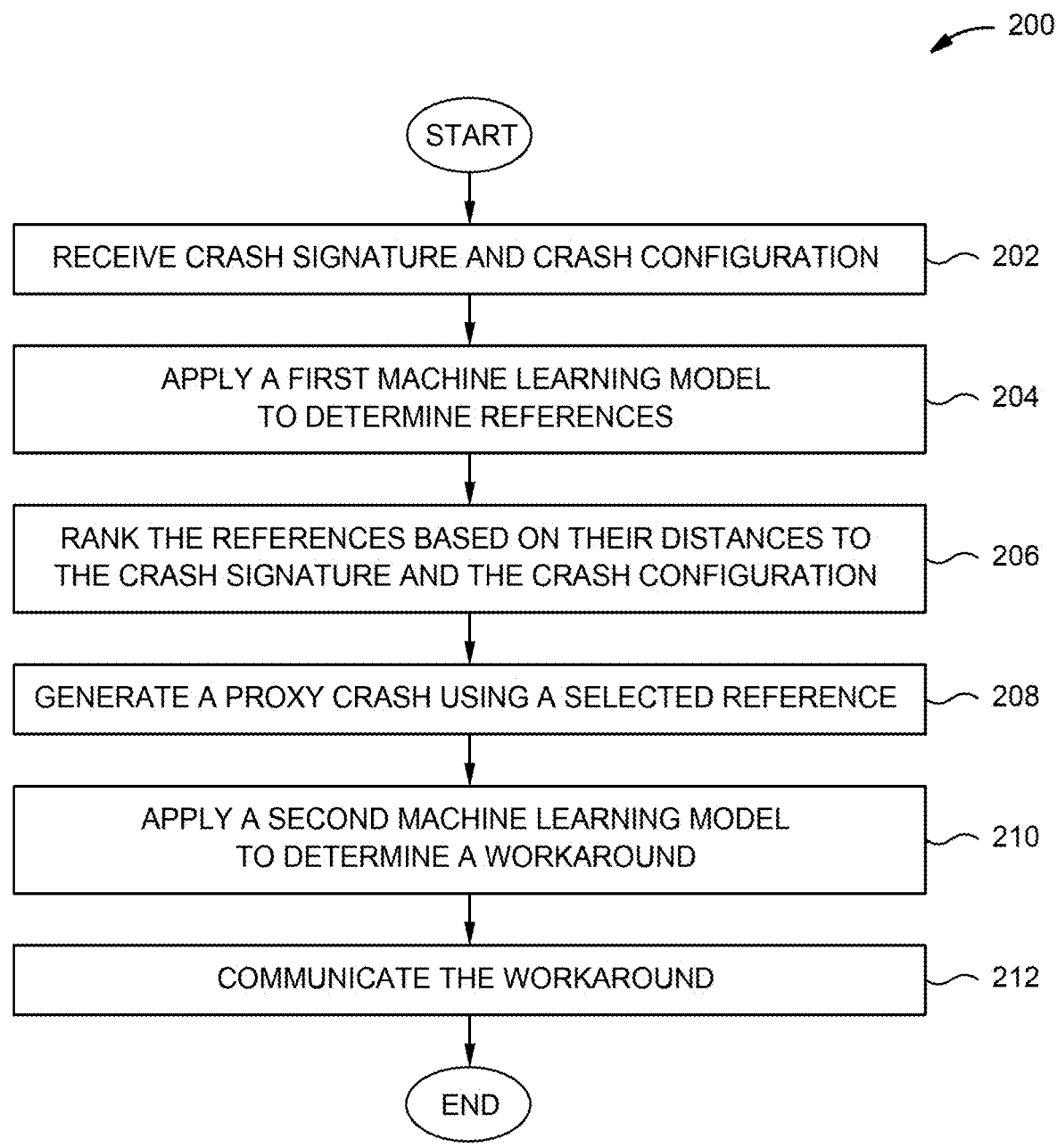
FIG. 2 is a flowchart of an example method in the system of FIG. 1.

FIG. 2 is a flowchart of an example method 200 in the system 100 of FIG. 1. The proxy crash device 108 may perform the method 200. In particular embodiments, by performing the method 200, the proxy crash device 108 generates a proxy crash that approximates a software application crash in a device 104 so that the software application crash can be diagnosed and resolved without reproducing the software application crash.

At 202, the proxy crash device 108 receives a crash signature 116 and a crash configuration 118 from a device 104. The device 104 may have automatically generated the crash signature 116 and the crash configuration 118 when the device 104 experienced a software application crash. The crash signature 116 may include information about the software application when the crash occurred. For example, the crash signature 116 may include a call stack, software variables, or software settings. The crash configuration 118 may include information about the device 104 when the software application crash occurred. For example, the crash configuration 118 may include environment variables, global settings, or device model. The proxy crash device 108 analyzes the crash signature 116 and the crash configuration 118 to determine a proxy crash that approximates the software application crash.

At 204, the proxy crash device 108 applies the first machine learning model 120 to determine references 122. The references 122 may be stored in a database 110. Each reference 122 includes a reference crash signature 124 and a reference crash configuration 126. The first machine learning model 120 may compare the crash signature 116 and the crash configuration 118 to the references 122 to determine one or more references 122 that most closely approximate the software application crash. For example, the first machine learning model 120 may determine distances between the references 122 and the crash signature 116 and the crash configuration 118. These distances may be calculated by comparing the crash signature 116 with the reference crash signatures 124 and by comparing the crash configuration 118 with the reference crash configurations 126. The first machine learning model 120 may determine the references 122 with the shortest distances to the crash signature 116 and the crash configuration 118.

At 206, the proxy crash device 108 ranks the references 122 based on their distances to the crash signature 116 and the crash configuration 118. For example, the reference 122 with the shortest distance to the crash signature 116 and the crash configuration 118 may be given the highest ranking. The rankings thus indicate how closely the references 122 approximate the software application crash in the device 104. The proxy crash device 108 may present the ranked references 122 to a developer. The developer may then select a reference 122 as representing a proxy crash that approximates the software application crash in the device 104.

At 208, the proxy crash device 108 generates a proxy crash 127 using the selected reference 122. By generating the proxy crash, 127 the proxy crash device 108 allows the developer to diagnose and resolve the crash in the device 104. For example, the developer may analyze the proxy crash 127 to determine the error that may have occurred in the device 104. The developer may then develop a fix for the error in the device 104 without reproducing the software application crash in the device 104.

At 210, the proxy crash device 108 applies a second machine learning model 128 to determine a workaround 132. The proxy crash device 108 may apply the second machine learning model 128 to the crash signature 116 with the crash configuration 118 to determine the workaround 132. For example, the second machine learning model 128 may adjust a portion of the crash configuration 118 and then execute the software application to see if the adjusted confirmation results in the software application crash. If the adjusted configuration does not result in the software application crash, the proxy crash device 108 may identify the adjusted configuration as a potential workaround 132. If the adjusted configuration results in the software application crash, then the proxy crash device 108 may determine that the adjusted configuration is not a potential workaround 132.

At 212, the proxy crash device 108 communicates the workaround 132 to the device 104. The device 104 may then implement the workaround 132 so that a user 102 may execute the software application on the device 104 without encountering the software application crash.

Figure 3:
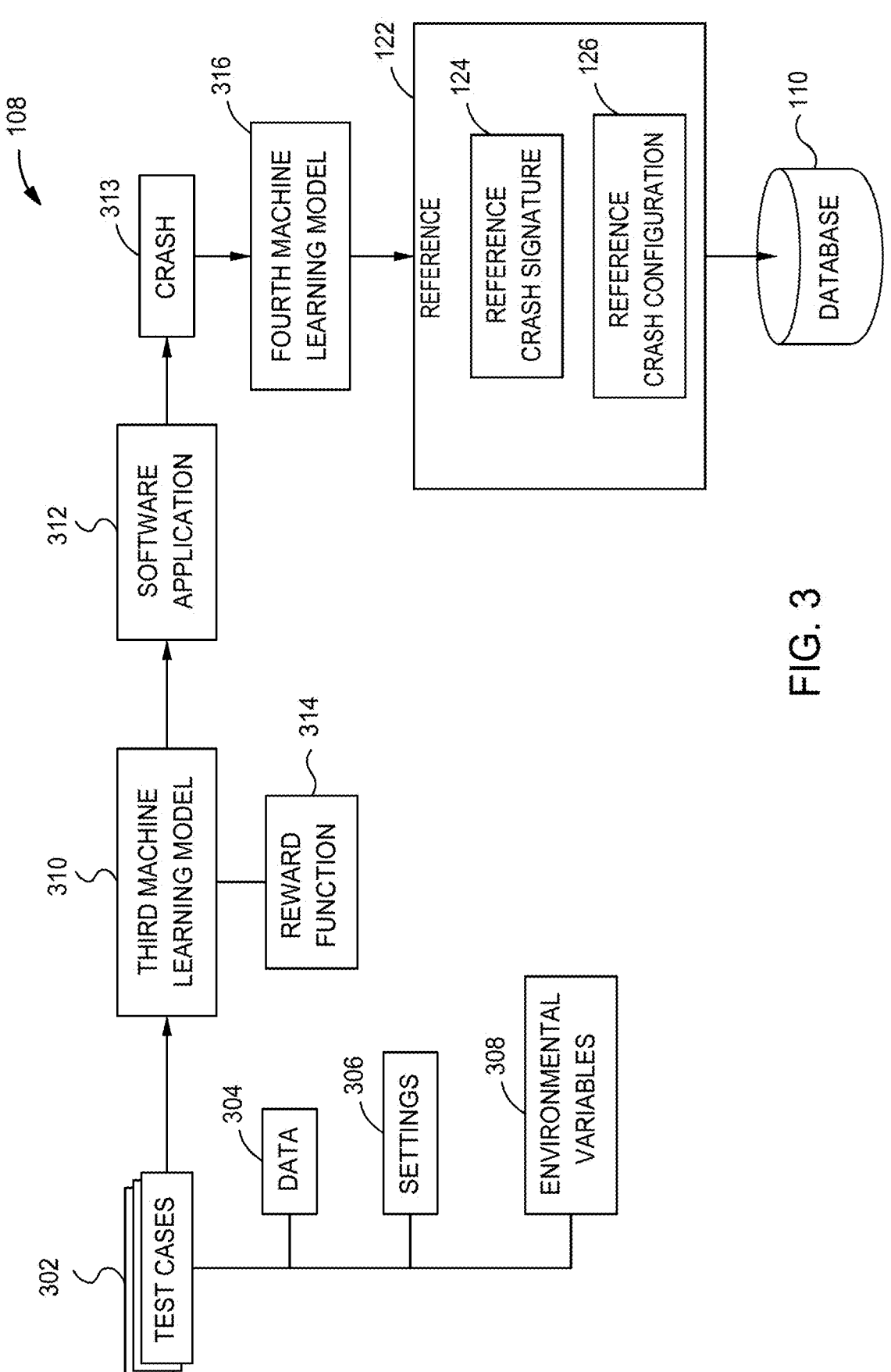
FIG. 3 illustrates an example proxy crash device in the system of FIG. 1.

FIG. 3 illustrates an example proxy crash device 108 in the system 100 of FIG. 1. Generally, FIG. 3 illustrates the proxy crash device 108 generating references 122 in the database 110. In particular embodiments, the proxy crash device 108 generates and stores references 122 in the database 110 that can be later used to determine and generate proxy crashes.

The proxy crash device 108 analyzes one or more test cases 302 to determine references 122. The test cases 302 may be a part of a suite of quality assurance tests. The test cases 302 may be executed against a software application to determine bugs or errors within the software application. The proxy crash device 108 may analyze these test cases 302 to generate the references 122.

Each test case 302 may include different components. For example, a test case 302 may include data 304, settings 306, and environmental variables 308. The data 304, settings 306, and environmental variables 308 may be parameters that govern the setup, initialization, or execution of the test case 302. The proxy crash device 108 may analyze or adjust the data 304, the settings 306 or the environmental variables 308 to generate the references 122.

The proxy crash device 108 applies a third machine learning model 310 to the test cases 302 to generate crashes 313. Generally, the third machine learning model 310 may adjust the data 304, the settings 306, or the environmental variables 308 of a test case 302 to determine if the adjustments cause a crash 313 in a software application 312. For example, the third machine learning model 310 may adjust the data 304, the settings 306, or the environmental variables 308 in a test case 302 for a software application 312. The third machine learning model 310 may then execute the adjusted test case 302 on the software application 312 to see if the software application 312 crashes. In particular embodiments, the third machine learning model 310 may use a reward function 314 in adjusting the test cases 302 to see if the software application 312 crashes with the adjustments. The reward function 314 may reward the machine learning model 310 when the third machine learning model 310 identifies an adjustment that causes a crash. The reward may encourage the third machine learning model 310 to explore or make similar adjustments to test cases 302 in the future to identify additional software crashes. In embodiments where the third machine learning model 310 does not use the reward function 314, the third machine learning model 310 may make predefined or preprogrammed adjustments to the test cases 302 to see if these adjustments result in a crash 313.

When the proxy crash device 108 encounters a crash 313 in the software application 312, the proxy crash device 108 may apply a fourth machine learning model 316 to analyze the crash 313 and to generate a reference 122 based on the crash 313. For example, the fourth machine learning model 316 may generate a crash signature for the software application crash 313. The fourth machine learning model 316 may then set that crash signature as the reference crash signature 124 for the reference 122. The reference crash signature 124 may include a call stack, software variables, and/or software settings of the software application 312 when the crash 313 occurred. The fourth machine learning model 316 may also log a configuration of the execution space of the software application 312 when the crash 313 occurred. The fourth machine learning model 316 may set that configuration as the reference crash configuration 126 of the reference 122. The reference crash configuration 126 may include global settings, environmental variables, or device models of the execution space of the software application 312. After generating the reference 122, the fourth machine learning model 316 may store the reference 122 into the database 110 for subsequent use. The crash 313 then effectively becomes the proxy crash 127 represented by the reference 122.

The third and fourth machine learning models 310 and 316 may implement any machine learning model or technique to execute the test cases 302 and to determine the references 122. For example, the third and fourth machine learning models 310 and 316 may implement a Bayesian model, natural language processing, image processing, convolutional networks, or supervised learning.

Figure 4:
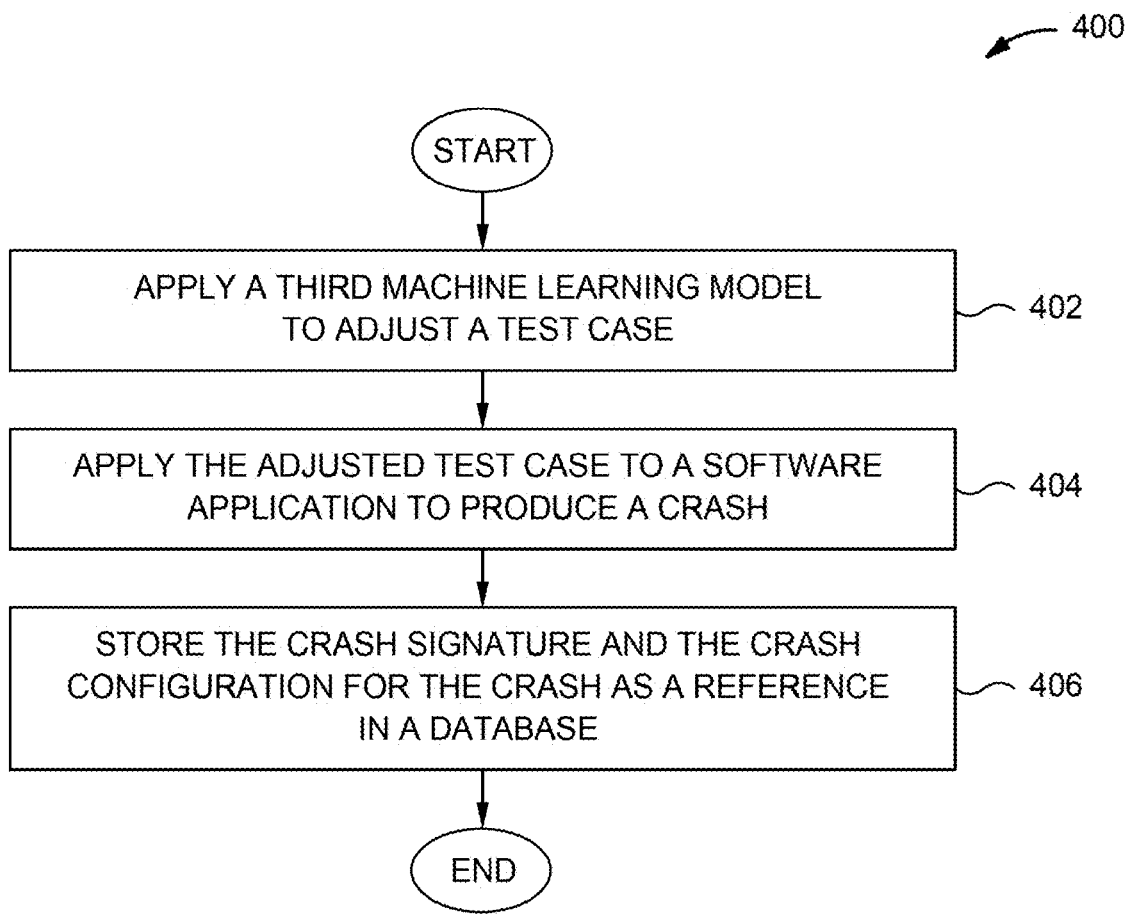
FIG. 4 is a flowchart of an example method in the system of FIG. 1.

FIG. 4 is a flowchart of an example method 400 in the system 100 of FIG. 1. The proxy crash device 108 may perform the method 400. In particular embodiments, by performing the method 400, the proxy crash device 108 generates references 122 that can be later used to determine proxy crashes.

At 402, the proxy crash device 108 applies a third machine learning model 310 to adjust a test case 302. For example, the proxy crash device 108 or the third machine learning model 310 may adjust one or more of the data 304, the settings 306, or the environmental variables 308 in the test case 302. At 404, the proxy crash device 108 applies the adjusted test case to a software application 312 to produce a crash 313. For example, the adjustments made to one or more of the data 304, the settings 306, or the environmental variables 308 of the test case 302 may cause the software application 312 to crash when the test case 302 is executed against the software application 312.

At 406, the proxy crash device 108 stores the crash signature and the crash configuration for the crash 313 as a reference 122 in a database 110. The proxy crash device 108 may have applied a fourth machine learning model 316 to the crash 313 to determine the reference 122. The crash signature for the crash 313 may be stored as the reference crash signature 124 for the reference 122. The configuration for the crash 313 may be stored as the reference crash configuration 126 for the reference 122. In this manner, the proxy crash device 108 applies a third machine learning model 310 and a fourth machine learning model 316 to automatically generate one or more references 122 using a suite of test cases 302 executed against a software application 312. The proxy crash device 108 may then use these references 122 to determine a proxy crash that approximates a crash in the software application 312 encountered by a user 102 using a device 104.

As an example, a test case 302 may have four adjustable arguments in the data 304, settings 306, and environmental variables 308. These arguments may be labeled A, B, C, and D. Each of these arguments may have the value 0 or 1. The proxy crash device 108 may adjust these arguments and execute the test case 302 against the software application 312. The proxy crash device 108 may determine that the following configurations of A, B, C, and D produce a crash with a crash signature δ: A1-B1-C0-D0; A1-B0-C0-D0; and A1-B1-C1-D1. Each of these three configurations produce the same crash signature δ. As a result, the proxy crash device 108 may generate and store the following references 122: (1) δ-A1-B1-C0-D0, (2) δ-A1-B0-C0-D0, and (3) δ-A1-B1-C1-D1.

A user 102 using the application 312 on a device 104 may encounter a crash with the configuration A1-B1-C0-D0 and the crash signature δ. This crash matches the first reference (δ-A1-B1-C0-D0). The crash is also very close to the second reference (δ-A1-B0-C0-D0). As a result, the proxy crash device 108 may give the first reference (δ-A1-B1-C0-D0) the highest rank and the second reference (δ-A1-B0-C0-D0) the second highest rank. A developer may analyze both of these references and their corresponding proxy crashes to diagnose or fix the crash experienced by the user 102.

Figure 5:
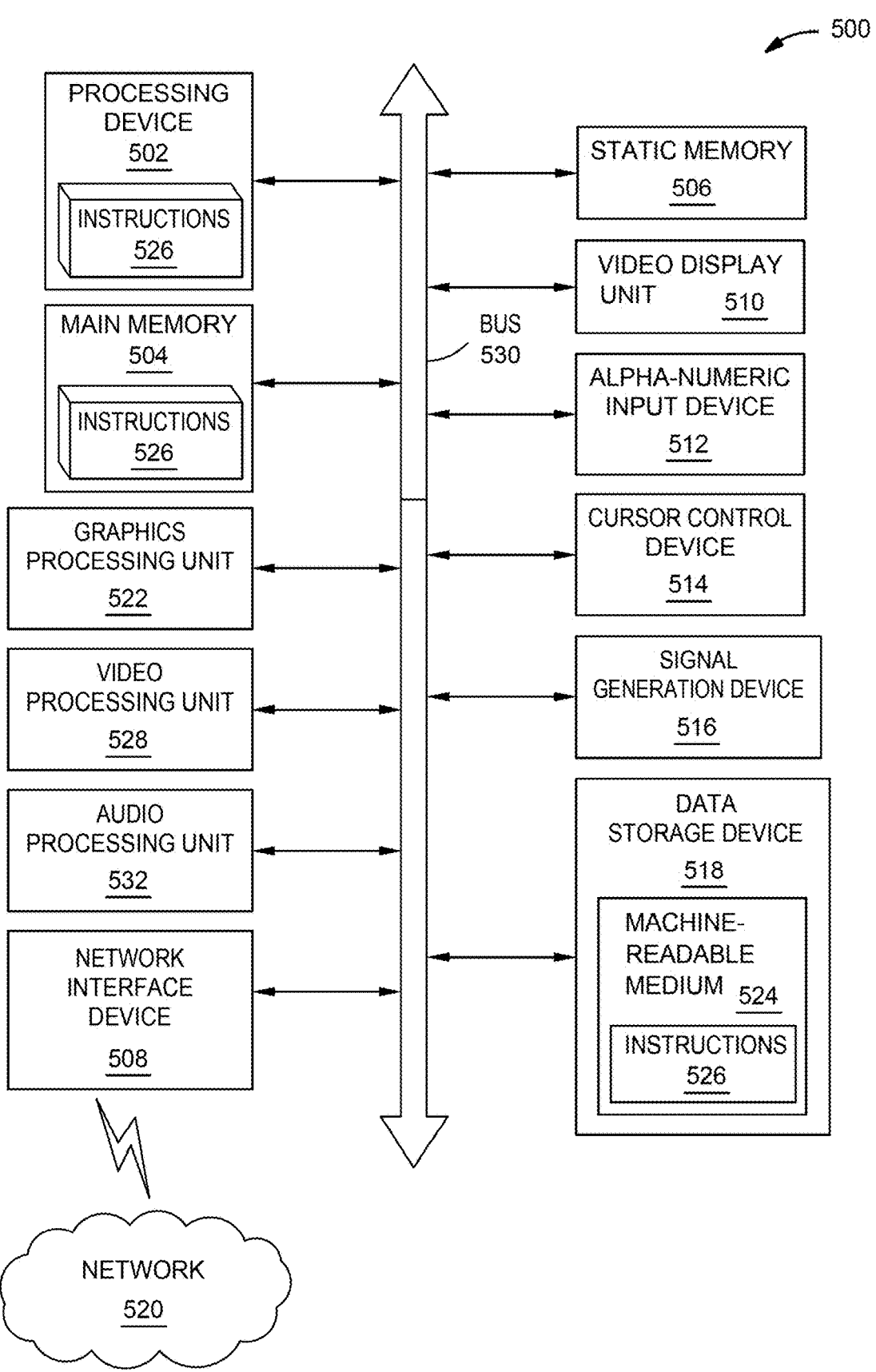
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
applying a first machine learning model to a test case for a software application to adjust the test case to produce an adjusted test case;
executing the adjusted test case on the software application to produce a software crash;
applying a second machine learning model to the software crash to generate a reference crash signature for the software crash; and
logging, using the second machine learning model, a reference crash configuration for the software crash.

2. The method of claim 1, wherein adjusting the test case comprises adjusting at least one of a setting, an environmental variable, or data of the test case.

3. The method of claim 1, wherein adjusting the test case is based on a reward function that produces a reward when executing the adjusted test case on the software application produces the software crash.

4. The method of claim 1, wherein the reference crash signature comprises at least one of a call stack, a software variable, a memory dump, or a software setting of the software application during the software crash.

5. The method of claim 1, wherein the reference crash configuration comprises at least one of a global setting of a device that executed the software application during the software crash, an environmental variable of the device, or a model of the device.

6. The method of claim 1, further comprising storing, in a database, the reference crash signature and the reference crash configuration as a reference for the software crash.

7. The method of claim 1, wherein the first machine learning model implements at least one of a Bayesian model, natural language processing, image processing, a convolutional network, or a supervised learning model.

8. The method of claim 1, further comprising providing a plurality of reference crash signatures and a plurality of reference crash configurations to a third machine learning model to determine a proxy crash.

9. A system comprising:
a memory; and
a processor communicatively coupled to the memory, wherein the processor:
applies a first machine learning model to a test case for a software application to adjust the test case to produce an adjusted test case;
executes the adjusted test case on the software application to produce a software crash;
applies a second machine learning model to the software crash to generate a reference crash signature for the software crash; and
logs, using the second machine learning model, a reference crash configuration for the software crash.

10. The system of claim 9, wherein adjusting the test case comprises adjusting at least one of a setting, an environmental variable, or data of the test case.

11. The system of claim 9, wherein adjusting the test case is based on a reward function that produces a reward when executing the adjusted test case on the software application produces the software crash.

12. The system of claim 9, wherein the reference crash signature comprises at least one of a call stack, a software variable, a memory dump, or a software setting of the software application during the software crash.

13. The system of claim 9, wherein the reference crash configuration comprises at least one of a global setting of a device that executed the software application during the software crash, an environmental variable of the device, or a model of the device.

14. The system of claim 9, wherein the processor stores, in a database, the reference crash signature and the reference crash configuration as a reference for the software crash.

15. The system of claim 9, wherein the first machine learning model implements at least one of a Bayesian model, natural language processing, image processing, a convolutional network, or a supervised learning model.

16. A non-transitory computer readable medium storing instructions that, when executed by a processor, cause the processor to:

apply a machine learning model to a test case for a software application to adjust the test case to produce an adjusted test case;

executing the adjusted test case on the software application to produce a software crash;

generate a reference crash signature for the software crash; and log a reference crash configuration for the software crash.

17. The medium of claim 16, wherein adjusting the test case comprises adjusting at least one of a setting, an environmental variable, or data of the test case.

18. The medium of claim 16, wherein adjusting the test case is based on a reward function that produces a reward when executing the adjusted test case on the software application produces the software crash.

19. The medium of claim 16, wherein the reference crash signature comprises at least one of a call stack, a software variable, a memory dump, or a software setting of the software application during the software crash.

20. The medium of claim 16, wherein the reference crash configuration comprises at least one of a global setting of a device that executed the software application during the software crash, an environmental variable of the device, or a model of the device.

* * * * *